US006562083B2

(12) United States Patent
Wood et al.

(10) Patent No.: US 6,562,083 B2
(45) Date of Patent: *May 13, 2003

(54) CANDLE WAX STABILIZED WITH S-TRIAZINES/HALS

(75) Inventors: Mervin G. Wood, Poughquag, NY (US); Andrea R. Smith, Wingdale, NY (US); Deborah DeHessa, Poughkeepsie, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/824,197

(22) Filed: Apr. 2, 2001

(65) Prior Publication Data

US 2002/0189155 A1 Dec. 19, 2002

(51) Int. Cl.⁷ ................................................. C11C 5/00
(52) U.S. Cl. ......................................... 44/275; 431/288
(58) Field of Search ............................. 44/275; 431/288

(56) References Cited

U.S. PATENT DOCUMENTS

| | | | | |
|---|---|---|---|---|
| 3,530,084 A | * | 9/1970 | Potts .......................... | 260/28.5 |
| 4,070,335 A | * | 1/1978 | Ramey et al. | |
| 4,379,721 A | * | 4/1983 | Qualitz et al. ................. | 106/21 |
| 4,616,051 A | * | 10/1986 | Paolino ....................... | 524/102 |
| 4,740,542 A | | 4/1988 | Susi ............................ | 524/87 |
| 5,714,530 A | | 2/1998 | Waterman .................... | 524/87 |
| 5,879,694 A | * | 3/1999 | Morrison et al. ............ | 424/405 |
| 5,964,905 A | * | 10/1999 | Camp et al. .................. | 44/275 |
| 6,117,997 A | | 9/2000 | Bulliard et al. .............. | 544/216 |
| 6,187,919 B1 | | 2/2001 | Birbaum et al. ............. | 544/216 |
| 6,221,115 B1 | | 4/2001 | Hyun et al. ................... | 44/275 |
| 6,262,153 B1 | * | 7/2001 | Webster et al. ................ | 524/99 |
| 6,296,674 B1 | * | 10/2001 | Trainor et al. ................ | 44/275 |

FOREIGN PATENT DOCUMENTS

| | | |
|---|---|---|
| EP | 0005922 | 12/1979 |
| EP | 0359488 | 3/1990 |
| EP | 0133964 | 7/1990 |
| EP | 0389427 | 9/1990 |
| JP | 3278554 | 12/1991 |
| WO | 94/13736 | 6/1994 |
| WO | 99/14206 | * 3/1999 |
| WO | 00/22037 | 4/2000 |
| WO | 01/79340 | 10/2001 |

OTHER PUBLICATIONS

"Antioridants in Wax–Replacement of BHT" Described in WO94/13736.*
R. van der Vennet, Candle Association Meeting in Housing, 1994.*
F. Ballentine et al., "Inhibiting Color Fading of Dyed Candles with CYASORB® Light Absorbers", The National Candle Association Melting, 1998.*
Ullmann's Encyclopedia of Industrial Chemistry, vol. A5, pp. 29–30.
National Candle Association Technical Meeting, Apr. 16, 1998, F.A. Ballentine et al., "Inhibiting Color Fading of Dyed Candles with CYASORB® Light Absorbers".
Abstract for JP3278554 (1991).

* cited by examiner

*Primary Examiner*—Margaret Medley
(74) *Attorney, Agent, or Firm*—Tyler A. Stevenson; Luther A. R. Hall

(57) ABSTRACT

White, dyed, dipped, unscented and/or scented candle wax is effectively stabilized against discoloration and fading by the incorporation therein of an s-triazine UV absorber plus a classic hindered amine and/or an antioxidant.

25 Claims, No Drawings

CANDLE WAX STABILIZED WITH S-TRIAZINES/HALS

The instant invention pertains to white, dyed, dipped, unscented and/or scented candle wax which is effectively stabilized against discoloration and fading by the incorporation therein of an s-triazine UV absorber plus a classic hindered amine and/or an antioxidant.

BACKGROUND OF THE INVENTION

Candles have been known for many centuries going back to the eighth century B.C. The nature of candles is described in Ullmann's Encyclopedia of Industrial Chemistry, Volume A5 at pages 29–30 where it is seen that candles are made from paraffin, beeswax and stearin as basic materials, and where a host of additives may also be present.

It is not surprising that with candles and wax becoming increasingly more important attention was paid as to how to stabilize the said materials. At the National Candle Association Meeting in Houston, 1994, R. van der Vennet presented a paper on "Antioxidants in Wax—Replacement of BHT" touting the use of Vitamin E (tocopherol) as an antioxidant to prevent the yellowing of wax when oxidized. WO 94/13736 describes the same invention.

EP 359,488 A3 and EP 133,964 B1 describe stabilized waxes used in cosmetics where the waxes are the same or similar to those used in candles.

EP 5,922 A1 describes lip cosmetics where the waxes are useful in lipsticks and are related to those useful in candles.

U.S. Pat. No. 5,879,694 describes in detail transparent gel candles both in composition and structure. The use of BHT as an antioxidant is mentioned.

At the National Candle Association Technical Meeting on Apr. 16, 1998, F. A. Ballentine et al., presented a paper entitled "Inhibiting Color Fading of Dyed Candles with CYASORB® Light Absorbers" in which the general theories of thermal oxidation and photodegradation are discussed along with data on the effect of light absorbers on color stability of dyed candle waxes. The light absorbers compared are 4-octyloxy-2-hydroxybenzophenone UV-531; 4-methoxy-2-hydroxybenzophenone UV-9; 2-(2-hydroxy-5-methylphenyl)-2H-benzotriazole UV-5365; 2-(2-hydroxy-5-tert-octylphenyl-2H-benzotriazole UV-5411 and 2-(2-hydroxy-3,5-di-tert-amylphenyl)-2H-benzotriazole UV-2337).

U.S. Pat. No. 5,964,905 teaches dyed and scented candle gels containing triblock copolymers and a hydrocarbon oil of high flash point. This reference teaches that a light (UV) absorber may be used to improve the shelf stability of the candle color when exposed to visible or ultraviolet light. Two preferred absorbers are ethylhexyl p-methoxycinnamate (PARSOL® MCX, Roche) and 2-(2-hydroxy-5-tert-octylphenyl)-2H-benzotriazole (CYASORB® 5411, Cytec).

WO 00/22037 teaches the stabilization of solid, shaped and colored wax articles, including candles, using a malonate UV absorber which may optionally contain a hindered amine moiety as part of the malonate compound structure. The wax articles are dyed with a variety of oil soluble dyes and pigments. The samples protected by dimethyl p-methoxybenzylidinemalonate exhibited better resistance to discoloration that did samples stabilized with selected benzotriazole or benzophenone UV absorbers.

Japanese Hei 3-278554 teaches that wax crayons (drawing materials) colored by organic pigments can be stabilized by a hindered amine and/or benzotriazole.

In respect to wax stabilization, the use of selected hindered amines and/or benzotriazole UV absorbers is also known in the prior art as seen in U.S. Pat. Nos. 3,530,084; 4,379,721; 4,616,051 and 5,964,905 and copending applications Ser. Nos. 09/495,495, 09/495,496 and 09/741,583.

None of these references teach the superior performance provided when the s-triazine UV absorbers are used in conjunction with a classic piperidine-based hindered amine and/or an antioxidant to stabilize candle wax.

OBJECTS OF THE INVENTION

The object of the invention is to provide for a white and unscented; white and scented; dyed and unscented; dyed and scented; dipped and unscented; or dipped and scented candle wax stabilized by a combination of a s-triazine UV absorber and a classic piperidine-based hindered amine and/or an antioxidant.

DETAILED DISCLOSURE

The instant invention pertains to a composition which comprises (a) candle wax which is white and unscented; white and scented; dyed and unscented; dyed and scented; dipped and unscented; or dipped and scented, and (b) an effective stabilizing amount of a combination of
  (i) an s-triazine UV absorber of formula I, II, III, IV, V or VI

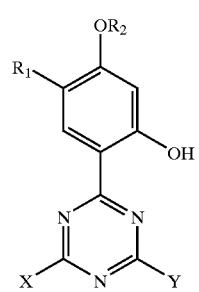

I

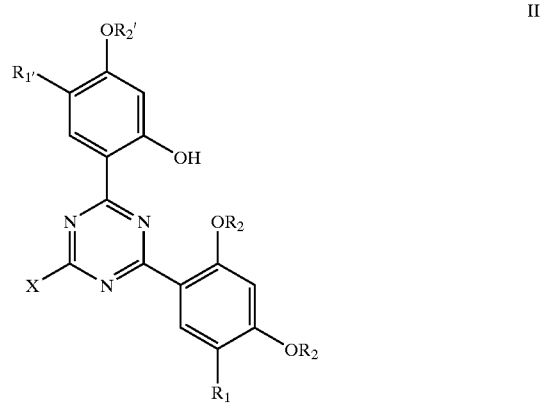

II

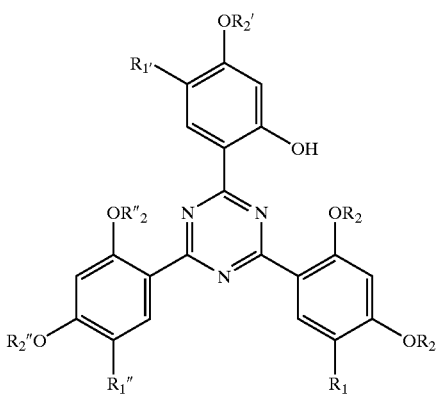

III

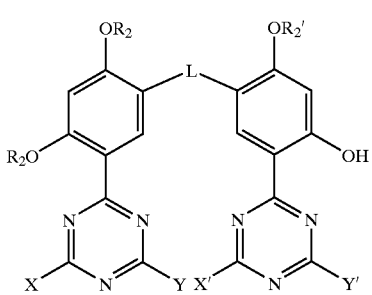

IV

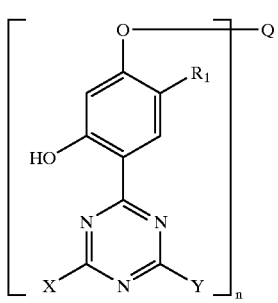

V

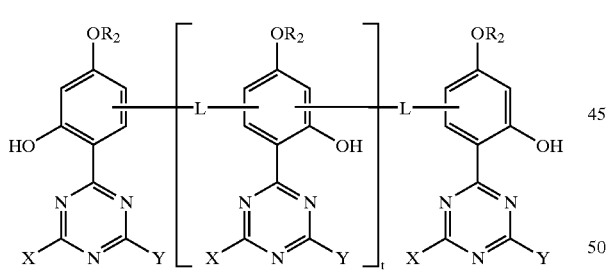

VI wherein

X and Y are independently phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms, halogen, —$SR_3$, —$SOR_3$ or —$SO_2R_3$; or said alkyl, said cycloalkyl or said phenylalkyl substituted by one to three halogen, —$R_4$, —$OR_5$, —$N(R_5)_2$, —$COR_5$, —$COOR_5$, —$OCOR_5$, —CN, —$NO_2$, —$SR_5$, —$SOR_5$, —$SO_2R_5$ or —$P(O)(OR_5)_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —$NR_5$—, —$CONR_5$—, —COO—, —OCO— or —CO groups or combinations thereof; or said alkyl or said cycloalkyl both substituted and interrupted by combinations of the groups mentioned above;

$R_3$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;

$R_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof; or straight or branched chain alkenyl of 2 to 18 carbon atoms;

$R_5$ is defined as is $R_4$; or $R_5$ is also hydrogen or straight or branched chain alkyl of 1 to 24 carbon atoms, alkenyl of 2 to 24 carbon atoms; or $R_5$ is a group for formula

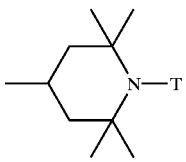

T is hydrogen, oxyl, hydroxyl, —$OT_1$, alkyl of 1 to 24 carbon atoms, said alkyl substituted by one to three hydroxy; benzyl or alkanoyl of 2 to 18 carbon atoms;

$T_1$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 to 10 carbon atoms or said aryl substituted by one to three alkyl of 1 to 4 carbon atoms;

$R_2$ is hydrogen, straight or branched chain alkyl of 1 to 24 carbon atoms or cycloalkyl of 5 to 12 carbon atoms; or said alkyl or said cycloalkyl substitute by one to four halogen, epoxy, glycidyloxy, furyloxy, —$R_4$, —$OR_5$, —$N(R_5)_2$, —$CON(R_5)_2$, —$COR_5$, —$COOR_5$, —$OCOR_5$, —$OCOC(R_5)$=$C(R_5)_2$, —$C(R_5)$=$CCOOR_5$, —CN, —NCO, or

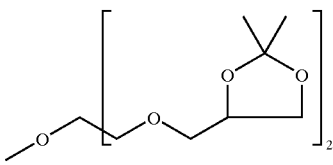

or combinations thereof; or said alkyl or said cycloalkyl interrupted by one to four epoxy, —O—, —$NR_5$—, —$CONR_5$—, —COO—, —OCO—, —CO—, —$C(R_5)$=$C(R_5)COO$—, —$OCOC(R_5)$=$C(R_5)$—, —$C(R_5)$=$C(R_5)$—, phenylene or phenylene-G-phenylene in which G is —O—, —S—, —$SO_2$—, —$CH_2$— or —C(CH$_3$)$_2$— or combinations thereof, or said alkyl or said cycloalkyl both substituted and interrupted by combinations of the groups mentioned above; or R$_2$ is —SO$_2$R$_3$ or —COR$_6$;

R$_6$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —R$_7$COOH or —NH—R$_8$—NCO;

R$_7$ is alkylene of 2 to 14 carbon atoms or phenylene;

R$_8$ is alkylene of 2 to 24 carbon atoms, phenylene, tolylene, diphenylmethane or a group

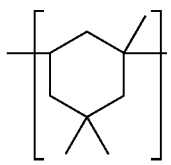

R$_1$, R$_1$' and R$_1$" are the same or different and are as defined for R$_1$;

R$_2$, R$_2$' and R$_2$" are the same or different and are as defined for R$_2$;

X, X', Y and Y' are the same or different and are as defined for X and Y;

t is 0 to 9;

L is straight or branched alkylene of 1 to 12 carbon atoms, cycloalkylene of 5 to 12 carbon atoms or alkylene substituted or interrupted by cyclohexylene or phenylene; or L is benzylidene; or L is —S—, —S—S—, —S—E—S—, —SO—, —SO$_2$—, —SO—E—SO—, —SO$_2$—E—SO$_2$—, —CH$_2$—NH—E—NH—CH$_2$— or

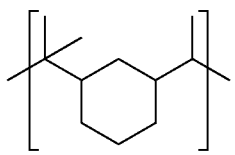

E is alkylene of 2 to 12 carbon atoms, cycloalkylene of 5 to 12 carbon atoms or alkylene interrupted or terminated by cycloalkylene of 5 to 12 carbon atoms;

n is 2, 3 or 4;

when n is 2; Q is straight or branched alkylene of 2 to 16 carbon atoms; or said alkylene substituted by one to three hydroxy groups; or said alkylene interrupted by one to three —CH═CH— or —O—; or said alkylene both substituted and interrupted by combinations of the groups mentioned above; or Q is xylylene or a group —CONH—R$_8$—NHCO—, —CH$_2$CH(OH)CH$_2$O—R$_9$—OCH$_2$CH(OH)CH$_2$—, —CO—R$_{10}$—CO—, or —(CH$_2$)$_m$—COO—R$_{11}$—OOC—(CH$_2$)$_m$—, where m is 1 to 3; or Q is

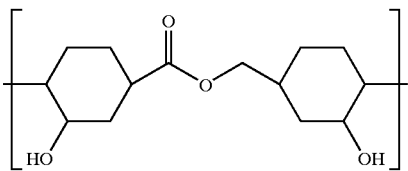

R$_9$ is alkylene of 2 to 50 carbon atoms; or said alkylene interrupted by one to ten —O—, phenylene or a group -phenylene-G-phenylene in which G is —O—, —S—, —SO$_2$—, —CH$_2$— or —C(CH$_3$)$_2$—;

R$_{10}$ is alkylene of 2 to 10 carbon atoms, or said alkylene interrupted by one to four —O—, —S— or —CH═CH—; or R$_{10}$ is arylene of 6 to 12 carbon atoms;

R$_{11}$ is alkylene of 2 to 20 carbon atoms or said alkylene interrupted by one to eight —O—;

when n is 3, Q is a group —[(CH$_2$)$_m$COO]$_3$—R$_{12}$ where m is 1 to 3, and R$_{12}$ is an alkanetriyl of 3 to 12 carbon atoms;

when n is 4, Q is a group —[(CH$_2$)$_m$COO]$_4$—R$_{13}$ where m is 1 to 3, and R$_{14}$ is an alkanetetrayl of 4 to 12 carbon atoms;

Z$_1$ is a group of formula

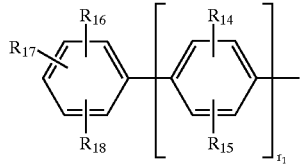

Z$_2$ is a group of formula

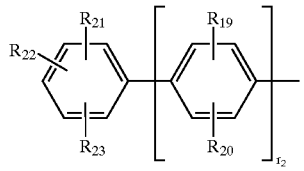

where r$_1$ and r$_2$ are independently of each other 0 or 1;

R$_{14}$, R$_{15}$, R$_{16}$, R$_{17}$, R$_{18}$, R$_{19}$, R$_{20}$, R$_{21}$, R$_{22}$ and R$_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or R$_{17}$ and R$_{18}$ or R$_{22}$ and R$_{23}$ together with the phenyl radical to which they are attached are a cyclic radical interrupted by one to three —O— or —NR$_5$—; and (ii) a classic piperidine-based hindered amine, wherein the ratio by weight of (i) to (ii) is from 10:1 to 1:10.

In another embodiment of the instant invention, the s-triazine UV absorbers are those of formula I where X and Y are the same or different and are phenyl or said phenyl substituted by one to three alkyl of 1 to 6 carbon atoms, halogen, hydroxy or alkoxy of 1 to 12 carbon atoms; or $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms or halogen;

$R_2$ is hydrogen, straight or branched chain alkyl of 1 to 24 carbon atoms or cycloalkyl of 5 to 12 carbon atoms; or said alkyl or said cycloalkyl substituted by one to three —$R_4$, —$OR_5$, —$COOR_5$, —$OCOR_5$ or combinations thereof; or said alkyl or cycloalkyl interrupted by one to three epoxy, —O—, —COO—, —OCO— or —CO—;

$R_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof;

$R_5$ is defined as is $R_4$; or $R_5$ is also hydrogen or straight or branched chain alkyl of 1 to 24 carbon atoms;

$Z_1$ is a group of formula

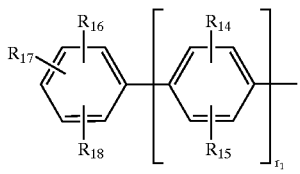

$Z_2$ is a group of formula

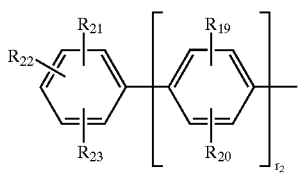

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are independently hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, or alkoxycarbonyl of 2 to 12 carbon atoms or aminocarbonyl.

In still another embodiment of the instant invention, the s-triazine UV absorbers are those of formula II where X is phenyl, naphthyl or said phenyl or said naphthyl substituted by one to three alkyl of 1 to 6 carbon atoms, by halogen, by hydroxy or by alkoxy of 1 to 6 carbon atoms or by mixtures thereof; or X is $Z_1$;

$R_1$ and $R_1'$ are independently as defined for $R_1$; and $R_2$ and $R_2'$ are independently as defined for $R_2$.

Another embodiment of the instant invention involves the s-triazine UV absorbers of formula III where $R_1$, $R_1'$ and $R_1''$ are independently as defined for $R_1$; and $R_2$, $R_2'$ and $R_2''$ are independently as defined for $R_2$.

In still another embodiment of the instant invention, the s-triazine UV absorbers are those of formula VI X and Y are independently phenyl or said phenyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$; and L is straight or branched alkylene of 1 to 12 carbon atoms, cycloalkylene of 5 to 12 carbon atoms or alkylene substituted or interrupted by cyclohexylene or phenylene.

Another embodiment of the instant invention involves the s-triazine UV absorbers of formula I where X and Y are the same or different and are phenyl or said phenyl substituted by one to three alkyl of 1 to 6 carbon atoms; $Z_1$ or $Z_2$;

$R_1$ is hydrogen or phenylalkyl of 7 to 15 carbon atoms;

$R_2$ is hydrogen, straight or branched chain alkyl of 1 to 18 carbon atoms; or said alkyl substituted by one to three —$R_4$, —$OR_5$ or mixtures thereof; or said alkyl interrupted by one to eight —O— or —COO—;

$R_4$ is aryl of 6 to 10 carbon atoms;

$R_5$ is hydrogen;

$Z_1$ is a group of formula

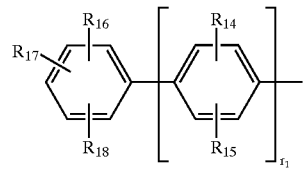

$Z_2$ is a group of formula

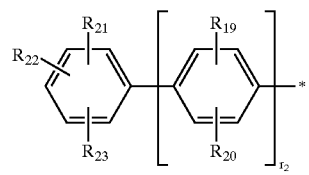

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are each hydrogen Specific s-triazine UV absorbers which are useful in the instant invention include (a) 2,4-bis[2-hydroxy-4-(3-butyloxy-2-hydroxypropoxy)phenyl]-6-mesityl-s-triazine;

(b) 2,4-bis(2,4-dimethylphenyl)-6-(2-hydroxy-4-octyloxyphenyl)-s-triazine, CYASORB® 1164, Cytec;

(c) 2,4-diphenyl-6-(2-hydroxy-4-hexyloxyphenyl)-s-triazine;

(d) 2,4-bis(2,4-dimethylphenyl)-6-[2-hydroxy-4-(3-do-/tridecyloxy-2-hydroxypropoxy)phenyl]-s-triazine;

(e) 2,4-bis(2,4-dimethylphenyl)-6-[2-hydroxy-4-(3-do-/tridecyloxy-2-hydroxypropoxy)-5-α-cumylphenyl]-s-triazine;

(f) reaction product of 2,4,6-tris(2,4-dihydroxyphenyl)-s-triazine with isooctyl α-halopropionate;

(g) 2-(2,4-dibutyloxyphenyl)-4,6-bis(2-hydroxy-4-butyloxyphenyl)-s-triazine;

(h) 2,4-bis(4-biphenylyl)-6-(2-hydroxy-4-octyloxycarbonylethylideneoxyphenyl)-s-triazine;
(i) 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
(j) 2,4-bis(2,4-dimethylphenyl)-6-[2-hydroxy-4-(3-benzyloxy-2-hydroxypropyloxy)phenyl]-s-triazine;
(k) 2,4-bis(2-hydroxy-4-butyloxyphenyl)-6-(2,4-di-butyloxyphenyl)-s-triazine;
(l) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups)
(m) methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio;
(n) 2,4,6-tris(2-hydroxy-4-isooctyloxycarbonylisopropylideneoxyphenyl)-s-triazine;
(o) 2,4-bis(2,4-dimethylphenyl)-6-(2-hydroxy-4-hexyloxy-5-α-cumylphenyl)-s-triazine; or
(p) 2,4,6-tris[2-hydroxy-4-(3-sec-butyloxy-2-hydroxypropyloxy)phenyl]-s-triazine.

In another embodiment of the instant invention, the s-triazine UV absorber of component (b)(i) is
(a) 2,4-bis[2-hydroxy-4-(3-butyloxy-2-hydroxypropoxy)phenyl]-6-mesityl-s-triazine;
(f) reaction product of 2,4,6-tris(2,4-dihydroxyphenyl)-s-triazine with isooctyl α-halopropionate;
(h) 2,4-bis(4-biphenylyl)-6-(2-hydroxy-4-octyloxycarbonylethylideneoxyphenyl)-s-triazine;
(l) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups) or
(n) 2,4,6-tris(2-hydroxy-4-isooctyloxycarbonylisopropylideneoxyphenyl)-s-triazine.

In another embodiment of the invention, the ratio by weight of (i) to (ii) is from 4:1 to 1:4.

In still another embodiment of the invention, the ratio by weight of (i) to (ii) is from 2:1 to 1:2.

In still another embodiment of the invention, the effective amount of the s-triazine UV absorber plus the hindered amine in the candle wax is 0.01 to 10% by weight based on the wax.

In another embodiment of the invention, the effective amount of the s-triazine UV absorber plus hindered amine in the candle wax is 0.1 to 2% by weight based on the wax.

In another embodiments of the invention, the effective amount of the s-triazine UV absorber plus hindered amine in the candle wax is 0.1 to 0.5% by weight based on the wax.

The classic piperidine-based hindered amines useful in the instant invention are those compounds having a substituted 2,2,6,6-tetraalkylpiperidine moiety where the nitrogen atom is substituted by hydrogen, alkyl, cycloalkyl, acyl or acyloxy.

Typical examples of such classic piperidine-based hindered amines are selected from the group consisting of
(a) bis(2,2,6,-tetramethylpiperidin-4-yl)sebacate,
(b) bis(1,2,2,6,-pentamethylpiperidin-4-yl)sebacate,
(c) di(1,2,2,6,6-pentamethylpiperidin-4-yl) (3,5-di-tert-butyl-4-hydroxybenzyl)butylmalonate,
(d) 4-benzoyloxy-2,2,6,6-teramethylpiperdine,
(e) 4-stearyloxy-2,2,6,6-tetramethylpiperidine,
(f) tris(2,2,6,6-tetramethylpiperidin-4-yl) nitrilotriacetate,
(g) polycondensation product of 2,4-dichloro-6-tert-octylamino-s-triazine and 4,4'-hexamethylenebis(amino-2,2,6,6-tetramethylpiperidine),
(h) polycondensation product of 1-(2-hydroxyethyl)-2,2,6,6-tetramethyl-4-hydroxypiperidine and succinic acid,
(i) polycondensation product of 4,4'-hexamethylenebis-(amino-2,2,6,6-tetramethylpiperidine) and 1,2-dibromoethane,
(j) tetrakis(2,2,6,6-tetramethylpiperidin-4-yl) 1,2,3,4-butanetetracarboxylate,
(k) tetrakis(1,2,2,6,6-pentamethylpiperidin-4-yl) 1,2,3,4-butanetetracarboxylate,
(l) polycondensation product of 2,4-dichloro-6-morpholino-s-triazine and 4,4'-hexamethylenebis(amino-2,2,6,6-tetramethylpiperidine),
(m) N,N',N'',N'''-tetrakis[(4,6-bis(butyl-1,2,2,6,6-pentamethylpiperidin-4-yl)-amino-s-triazin-2-yl]-1,10-diamino-4,7-diazadecane,
(n) octamethylene bis(2,2,6,6-tetramethylpiperidin-4-carboxylate),
(o) N-2,2,6,6-tetramethylpiperidin-4-yl-n-dodecylsuccinimide,
(p) N-1,2,2,6,6-pentamethylpiperidin-4-yl-n-dodecylsuccinimide,
(q) N-1-acetyl-2,2,6,6-tetramethylpiperidin-4-yln-dodecylsuccinimide,
(r) 4-$C_{15}$–$C_{17}$alkanoyloxy-2,2,6,6-tetramethylpiperidine,
(s) polycondensation product of 2,4-dichloro-6-cyclohexylamino-s-triazine and 4,4'-hexamethylenebis(amino-2,2,6,6-tetramethylpiperidine),
(t) 1,5-bis(2,2,6,6-tetramethylpiperidin-4-yl)-1,5-diaza-4-oxopropane,
(u) copolymer of methyl methacrylate, ethyl acrylate and 2,2,6,6-tetramethylpiperidin-4-yl acrylate,
(v) copolymer of N-octadecylmaleimide, styrene and N-(2,2,6,6-tetramethylpiperidin-4yl)maleimide,
(w) 1,3,5-tris[3-(2,2,6,6-piperidin-4-ylamino)-2-hydroxypropyl] isocyanurate,
(x) olefin copolymer containing units derived from N-[2-(2,2,6,6-tetramethylpiperidin-4-yl)oxalamid-1-yl] maleimide,
(y) 2,2,4,4-tetramethyl-7-oxa-3,20-diaza-21-oxo-dispiro[5,1,11,2]heneicosane,
(z) $C_{12}$–$C_{14}$alkyl 3-(2,2,4,4-tetramethyl-7-oxa-3,20-diaza-21-oxo-dispiro[5,1,11,2]heneicosane-20-yl)propionate,
(aa) reaction product of epichlorohydrin and 2,2,4,4-tetramethyl-7-oxa-3,20-diaza-21-oxo-dispiro[5,1,11,2] heneicosane,
(bb) 1,3-di(2,2,6,6-tetramethylpiperidin-4-yl) 2,4-ditridecyl butanetetracarboxylate,
(cc) 1,3-di(1,2,2,6,6-pentamethylpiperidin-4-yl) 2,4-ditridecyl butanetetracarboxylate,
(dd) polycondensation product of 3,9-bis(1,1-dimethyl-2-hydroxyethyl)-2,4,8,10-tetraoxaspiro[5.5]undecane, tetramethyl 1,2,3,4-butanetetra-carboxylate and 2,2,6,6-tetramethyl-4-hydroxypiperidine.
(ee) polycondensation product of 3,9-bis(1,1-dimethyl-2-hydroxyethyl)-2,4,8,10-tetraoxaspiro[5.5]undecane, tetramethyl 1,2,3,4-butanetetra-carboxylate and 1,2,2,6,6-pentamethyl-4-hydroxypiperidine,
(ff) 1,4-bis(2,2,6,6-tetramethylpiperidin-4-yl)-2,2-dimethyl-1,4-diaza-4-oxopropane,
(gg) reaction product of 4-amino-2,2,6,6-tetramethylpiperidine and tetramethylolacetylenediurea,
(hh) 1,6-hexamethylenebis[N-formyl-N-(2,2,6,6-tetramethylpiperidin-4-yl)amine],
(ii) copolymer of N-(2,2,6,6-tetramethylpiperdin-4-yl) maleimide and a $C_{20}$–$C_{24}$-alpha-olefin,
(jj) poly[3-(2,2,6,6-tetramethylpiperidin-4-yloxy)propyl-methyl-siloxane], (kk) polycondensation product of 2,4-dichloro-6-[N-butyl-N-(2,2,6,6-tetramethylpiperidin-4-yl)amino]-s-triazine and 1,10-diamino-4,7-diazadecane, or
(ll) dodecyl 3-(2,2,4,4-tetramethyl-7-oxa-3,20-diaza-21-oxo-dispiro[5,1,11,2]heneicosane-20-yl)propionate.

In another embodiment of the instant invention, the classic hindered amine is
(a) bis(2,2,6,6-tetramethylpiperidin-4-yl)sebacate,
(b) bis(1,2,2,6,6-pentamethylpiperidin-4-yl)sebacate,
(c) di(1,2,2,6,6-pentamethylpiperidin-4-yl) (3,5-di-tert-butyl-4-hydroxybenzyl)butylmalonate,
(g) polycondensation product of 2,4-dichloro-6-tert-octylamino-s-triazine and 4,4'-hexamethylenebis(amino-2,2,6,6-tetramethylpiperidine),
(h) polycondensation product of 1-(2-hydroxyethyl)-2,2,6,6-tetramethyl-4-hydroxypiperidine and succinic acid, or
(m) N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

In another embodiment of the invention, a further UV absorber which is benzotriazole, a benzophenone, an α-cyanoacrylate, an oxanilide, a cinnamate, a malonate, a benzoate or a salicylate, or a mixture thereof is also present.

In another embodiment of the invention, the UV absorber is a benzotriazole or a benzophenone.

Examples of such additional UV absorbers useful in the instant invention are
(a) 4-octyloxy-2-hydroxybenzophenone;
(b) 4-methoxy-2-hydroxybenzophenone;
(c) 2-(2-hydroxy-5-methylphenyl)-2H-benzotriazole;
(d) 2-(2-hydroxy-5-tert-octylphenyl-2H-benzotriazole;
(e) 2-(2-hydroxy-3,5-di-tert-amylphenyl)-2H-benzotriazole;
(f) octyl 3-(benzotriazol-2-yl)-5-tert-butyl-4-hydroxyhydrocinnamate;
(g) 2-(2-hydroxy-3,5-di-tert-butylphenyl)-2H-benzotriazole;
(h) 2-(2-hydroxy-5-tert-butylphenyl)-2H-benzotriazole;
(i) 5-chloro-2-(2-hydroxy-3,5-di-tert-butylphenyl)-2H-benzotriazole;
(j) 5-chloro-2-(2-hydroxy-3-tert-butyl-5-methylphenyl)-2H-benzotriazole;
(k) 2-(2-hydroxy-3-sec-butyl-5-tert-butylphenyl)-2H-benzotriazole;
(l) 2-(2-hydroxy-4-octyloxyphenyl)-2H-benzotriazole;
(m) 2-(2-hydroxy-3-dodecyl-5-methylphenyl)-2H-benzotriazole;
(n) 2-[2-hydroxy-3,5-di(α,α-dimethylbenzyl)phenyl]-2H-benzotriazole;
(o) 2-[2-hydroxy-3-(α,α-dimethylbenzyl)-5-tert-octylphenyl]-2H-benzotriazole;
(p) 2-{2-hydroxy-3-tert-butyl-5-[2-(omega-hydroxy-octa(ethyleneoxy)carbonyl)ethyl]phenyl}-2H-benzotriazole;
(q) 2-{2-hydroxy-3-tert-butyl-5-[2-(octyloxy)carbonyl)ethyl]phenyl}-2H-benzotriazole.
(r) 2-ethylhexyl p-methoxycinnamate;
(s) 4-methoxy-2,2'-dihydroxybenzophenone; or
(t) 4,4'dimethoxy-2,2'-dihydroxybenzophenone.

Still other examples of UV absorbers useful in the instant invention are
(a) 4-octyloxy-2-hydroxybenzophenone;
(b) 4-methoxy-2-hydroxybenzophenone;
(d) 2-(2-hydroxy-5-tert-octylphenyl-2H-benzotriazole;
(o) 2-[2-hydroxy-3-(α,α-dimethylbenzyl)-5-tert-octylphenyl]-2H-benzotriazole;
(p) 2-{2-hydroxy-3-tert-butyl-5-[2-(omega-hydroxy-octa(ethyleneoxy)carbonyl)ethyl]phenyl}-2H-benzotriazole; or
(q) 2-{2-hydroxy-3-tert-butyl-5-[2-(octyloxy)carbonyl)ethyl]phenyl}-2H-benzotriazole.

Another embodiment of the instant invention involves a composition wherein an antioxidant which is a phenolic antioxidant, phosphite, nitrone, amine oxide or hydroxylamine, or mixture thereof is also present.

Examples of the above-embodiment are wherein the effective amount of s-triazine UV absorber in combination with the hindered amine compound and an antioxidant is 0.01 to 10% by weight based on the wax.

Another embodiment is where the effective amount of s-triazine UV absorber in combination with the hindered amine compound and an antioxidant is 0.1 to 2% by weight based on the wax.

Still another embodiment is where the effective amount of s-triazine UV absorber in combination with the hindered amine compound and an antioxidant is 0.1 to 0.5% by weight based on the wax.

Examples of the antioxidants useful in this invention are
n-octadecyl 3,5-di-tert-butyl-4-hydroxyhydrocinnamate,
neopentanetetrayl tetrakis(3,5-di-tert-butyl-4-hydroxyhydrocinammate),
di-n-octadecyl 3,5-di-tert-butyl-4-hydroxybenzylphosphonate,
1,3,5-tris(3,5-di-tert-butyl-4-hydroxybenzyl)isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl)isocyanurate,
1,1,3,-tris(2-methyl-4-hydroxy-5-tert-butylphenyl)butane,
1,3,5-tris[2-(3,5-di-tert-butyl-4-hydroxyhydrocinnamoyloxy)ethyl]isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl)butyrate],
octyl 3,5-di-tert-butyl-4-hydroxybenzylmercaptoacetate,
bis(3,5-di-tert-butyl-4-hydroxyhydrocinnamoyl)hydrazide,
N,N-di-($C_{12}$–$C_{24}$alkyl)-N-methyl-amine oxide, or
N,N-dialkylhydroxylamine prepared from di(hydrogenated tallow)amine by direct oxidation.

Still other embodiments of antioxidants useful in the instant invention are
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl)isocyanurate,
2,6-di-tert-butyl-p-cresol, or
2,2'-ethylidene-bis(4,6-di-tert-butylphenol).

It should be noted that candles contain a host of various components. The base materials may be made up of the following:

paraffin wax,
natural oils,
polyamide plus fatty acid/ester,
fatty acids such as stearin,
opacifiers,
beeswax,
glycerides plus oxidized wax,
alcohols, and
ethylene oligomers.

Candles also contain a number of additives such as the following:
mold release agents,
fragrances,
insect repellents or insecticides,
hardeners,
crystal modifiers,
clarifiers,
guttering reducers,
colorants,
f.p. control agents,
stretchability improvers,
gelling agents,
extrusion aids, and
vortex reducers.

Each of the various components are meant to control or modify the properties of the candle to insure proper burning, reduce channelling, aid in uniform melting, and the like. The colorants and fragrances obviously are there to provide the proper color, scent or other aesthetic appeal.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a copolymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or comonomer units. The most common structure found in KRATON® D series is a linear ABA block with styrene-butadiene-styrene (SBS) or styrene-isoprene-styrene (SIS).

The following examples are meant for illustrative purposes only and are not to be construed to limit the instant invention in any manner whatsoever.

Raw Materials

Wax samples are supplied by the Candle-Lite Corporation. These samples contain dyes and fragrances.

The UV absorbers and hindered amine stabilizers are obtained from the Ciba Speciality Chemicals Corporation.

Sample Preparation

The wax samples obtained from the Candle-Lite Corporation already contain a dye and a fragrance (scent). In these cases, the wax is melted and the appropriate stabilizer(s) is (are) added and dissolved in the molten wax. The stabilized wax is then poured into five (5) 44 mm diameter aluminum pans giving five (5) wax disks.

Sample Exposure

Triplicate samples of each disk are exposed under a bank of six (6) cool-white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer; D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta($\Delta$) E is calculated as follows:

$$[(\text{Delta } L)^2 + (\text{Delta } a)^2 + (\text{Delta } b)^2]^{1/2} = \text{Delta } E.$$

EXAMPLE 1

2,4-Bis[2-hydroxy-4-(3-butyloxy-2-hydroxypropoxy)phenyl]-6-mesityl-s-triazine

This compound is prepared according to the general procedure given in WO 99/67226.

EXAMPLE 2

Color Fade of Pink Scented Candle Wax under Fluorescent Lamp Exposure

A variety of different stabilizers are evaluated in pink scented candle wax obtained from the Candle-Lite Corporation under fluorescent lamp exposure. The $\Delta E$ values represent the change in color after the indicated days of exposure. A low $\Delta E$ value indicates less change in color and is highly desired.

| Sample* (wt % add) | $\Delta E$ after 30 days |
|---|---|
| Blank (no add) | 14.47 |
| D (0.3%) | 10.00 |
| B (0.15%) + C (0.15%) | 8.93 |
| B (0.15%) + D (0.15%) | 3.42 |
| E (0.15%) + D (0.15%) | 3.02 |

*B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
D is bis(1,2,2,6,6-pentamethylpiperidin-4-yl) sebacate, TINUVIN ® 292, CIBA.
E is 2,4-bis[2-hydroxy-4-(3-butyloxy-2-hydroxypropoxy)phenyl]-6-mesityl-s-triazine, the compound of Example 1.

These data show that an s-triazine UV absorber (Compound E) in combination with a classic hindered amine protects the pink scented candle wax from unwanted discoloration far better than conventional stabilizer systems.

EXAMPLE 3

Color Fade of Pink Scented Candle Wax Under UV Lamp Exposure

A variety of different stabilizers are evaluated in pink scented candle wax obtained from the Candle-Lite Corporation under UV lamp exposure. The $\Delta E$ values represent the change in color after the indicated days of exposure. A low $\Delta E$ value indicates less change in color and is highly desired.

| Sample* (wt % add) | ΔE after 32 days |
|---|---|
| Blank (no add) | 21.10 |
| D (0.3%) | 16.24 |
| B (0.15%) + C (0.15%) | 11.15 |
| A (0.15%) + D (0.15%) | 9.84 |
| E (0.15%) + D (0.15%) | 5.27 |

*A is octyl 3-(benzotrizol-2-yl)-5-tert-butyl-4-hydroxyhydrocinnamate, TINUVIN ® 384, CIBA.
B is 2-(2-hydroxy-5-tert-octylphenyl-2H-benzotriazole, TINUVIN ® 329, CIBA.
C is 4-octyloxy-2-hydroxybenzophenone, CHIMMASORB ® 81, CIBA.
D is bis(1,2,2,6,6-pentamethylpiperidin-4-yl) sebacate, TINUVIN ® 292, CIBA.
E is 2,4-bis[2-hydroxy-4-(3-butyloxy-2-hydroxypropoxy)phenyl]-6-mesityl-s-triazine, the compound of Example 1.

These data show that an s-triazine UV absorber (Compound E) in combination with a classic hindered amine protects the pink scented candle wax from unwanted discoloration far better than conventional stabilizer systems.

EXAMPLE 4

Color Fade of Gray Scented Candle Wax Under Fluorescent Lamp Exposure

A variety of different stabilizers are evaluated in gray scented candle wax obtained from the Candle-Lite Corporation under fluorescent lamp exposure. The ΔE values represent the change in color after the indicated days of exposure. A low ΔE value indicates less change in color and is highly desired.

| Sample* (wt % add) | ΔE after 29 days |
|---|---|
| Blank (no add) | 15.72 |
| F (0.3%) | 11.57 |
| A (0.3%) | 9.88 |
| B (0.15%) + C (0.15%) | 8.01 |
| A (0.15%) + F (0.15%) | 3.20 |
| E (0.15%) + D (0.15%) | 2.51 |

*A is octyl 3-(benzotriazole-2-yl)-5-tert-butyl-4-hydroxyhydrocinnamate, TINUVIN ® 384, CIBA.
B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
D is bis(1,2,2,6,6-pentamethylpiperdin-4-yl) sebacate, TINUVIN ® 292, CIBA.
E is 2,4-bis[2-hydroxy-4-(3-butyloxy-2-hydroxypropoxy)phenyl]-6-mesityl-s-triazine, the compound of Example 1.
F is bis(1-octyloxy-2,2,6,6-tetramethylpiperidin-4-yl) sebacate, TINUVIN ® 123, CIBA.

These data show that an s-triazine UV absorber (Compound E) in combination with a classic hindered amine protects the gray scented candle wax from unwanted discoloration far better than conventional stabilizer systems.

EXAMPLE 5

Color Fade of Gray Scented Candle Wax Under UV Lamp Exposure

A variety of different stabilizers are evaluated in gray scented candle wax obtained from the Candle-Lite Corporation under UV lamp exposure. The ΔE values represent the change in color after the indicated days of exposure. A low ΔE value indicates less change in color and is highly desired.

| Sample* (wt % add) | ΔE after 23 days |
|---|---|
| Blank (no add) | 30.07 |
| F (0.3%) | 25.70 |
| B (0.15%) + C (0.15%) | 10.96 |
| A (0.3%) | 9.14 |
| A (0.15%) + F (0.15%) | 5.11 |
| E (0.15%) + D (0.15%) | 4.07 |

*A is octyl 3-(benzotriazole-2-yl)-5-tert-butyl-4-hydroxyhydrocinnamate, TINUVIN ® 384, CIBA.
B is 2-(2-hydroxy-5-tert-octylphenyl)-2H-benzotriazole, TINUVIN ® 329, CIBA.
C is 4-octyloxy-2-hydroxybenzophenone, CHIMMASORB ® 81, CIBA.
D is bis(1,2,2,6,6-pentamethylpiperidin-4-yl) sebacate, TINUVIN ® 292, CIBA.
E is 2,4-bis[2-hydroxy-4-(3-butyloxy-2-hydroxypropoxy)phenyl]-6-mesityl-s-triazine, the compound of Example 1.
F is bis(1-octyloxy-2,2,6,6-tetramethylpiperidin-4-yl) sebacate, TINUVIN ® 123, CIBA.

These data show that an s-triazine UV absorber (Compound E) in combination with a classic hindered amine protects the gray scented candle wax from unwanted discoloration far better than conventional stabilizer systems.

EXAMPLE 6

Green scented candle wax is well stabilized by 0.2% by weight of 2,4-bis(biphenylyl)-6-(2-hydroxy-4-octyloxycarbonylethylideneoxyphenyl)-s-triazine in combination with 0.2% by weight of bis(2,2,6,6-tetramethylpiperidin-4-yl)sebacate.

EXAMPLE 7

Yellow scented candle wax is well stabilized by 0.1% by weight of 2-phenyl-4-[3-sec-butyloxy-2-hydroxypropyloxy) phenyl]-6-[2-hydroxy-4-(sec-amyloxy-2-hydroxypropyloxy)phenyl]-s-triazine in combination with 0.1% by weight of bis(1,2,2,6,6-pentamethylpiperidin-4-yl) sebacate.

EXAMPLE 8

Red unscented candle wax is well stabilized by 0.1% by weight of 2,4-bis(2,4-dimethylphenyl)-6-[2-hydroxy-4-(3-benzyloxy-2-hydroxypropyloxy)phenyl]-s-triazine in combination with 0.1% by weight of di(1,2,2,6,6-pentamethylpiperidin-4-yl) (3,5-di-tert-butyl-4-hydroxybenzyl)butylmalonate.

EXAMPLE 9

Red unscented candle wax is well stabilized by 0.2% by weight of 2,4-bis(2-hydroxy-4-butyloxyphenyl)-6-(2,4-di-butyloxyphenyl)-s-triazine in combination with 0.2% by weight of 4-benzoyloxy-2,2,6,6-tetramethylpiperidine.

EXAMPLE 10

Red unscented candle wax is well stabilized by 0.1% by weight of 2,4-bis(2,4-dimethylphenyl)-6-[2-hydroxy-4-(3-nonyloxy*-2-hydroxypropyloxy)-5-α-cumylphenyl]-s-triazine (where * denotes a mixture of octyloxy, nonyloxy and decyloxy groups) in combination with 0.1% by weight of 4-stearyloxy-2,2,6,6-tetramethylpiperidine.

EXAMPLE 11

Red unscented candle wax is well stabilized by 0.2% by weight of methylenebis-[2,4-bis(2,4-dimethylphenyl)-6-[2-hydroxy-4-(3-butyloxy-2-hydroxypropyloxy)phenyl]-s-triazine, methylene bridged dimer mixture bridged in the 3:5', 5:5' and 3:3' positions in a 5:4:1 ratio in combination with 0.1% by weight of tris(2,2,6,6-tetramethylpiperidin-4-yl) nitrilotriacetate.

EXAMPLE 12

Yellow unscented candle wax is well stabilized by 0.2% by weight of 2,4,6-tris(2-hydroxy-4-isooctyloxycarbonylisopropylideneoxyphenyl)-s-triazine in combination with 0.1% by weight of the polycondensation product of 2,4-dichloro-6-tert-octylamino-s-triazine and 4,4'-hexamethylenebis(amino-2,2,6,6-tetramethylpiperidine).

EXAMPLE 13

Yellow unscented candle wax is well stabilized by 0.2% by weight of 2,4-bis(2,4-dimethylphenyl)-6-[2-hydroxy-4-hexyloxy-5-α-cumylphenyl]-s-triazine in combination with 0.2% by weight of the polycondensation product of 1-(2-hydroxyethyl)-2,2,6,6-tetramethyl-4-hydroxypiperidine and succinic acid.

EXAMPLE 14

Blue unscented candle wax is well stabilized by 0.2% by weight of 2,4-bis(2,4-dimethylphenyl)-6-(2-hydroxy-4-octyloxyphenyl)-s-triazine in combination with 0.1% by weight of the polycondensation product of 4,4'-hexamethylenebis-(amino-2,2,6,6-tetramethylpiperidine) and 1,2-dibromoethane.

EXAMPLE 15

Blue unscented candle wax is well stabilized by 0.2% by weight of 2-mesityl-4,6-bis[2-hydroxy-4-(3-butyloxy-2-hydroxypropyloxy)phenyl]-s-triazine in combination with 0.2% by weight of tetrakis(2,2,6,6-tetramethylpiperidin-4-yl) 1,2,3,4-butanetetracarboxylate.

EXAMPLE 16

Yellow scented candle wax is well stabilized by 0.2% by weight of 2,4,6-tris[2-hydroxy-4-(3-sec-butyloxy-2-hydroxypropyloxy)phenyl]-s-triazine in combination with 2% by weight of tetrakis(1,2,2,6,6-pentamethylpiperidin-4-yl) 1,2,3,4-butanetetracarboxylate.

EXAMPLE 17

Yellow scented candle wax is well stabilized by 0.1% by weight of the mixture prepared by the reaction of 2,4,6-tris(2,4-dihydroxyphenyl)-s-triazine with isooctyl α-halopropionate in combination with 0.2% by weight of the polycondensation product of 2,4-dichloro-6-morpholino-s-triazine and 4,4'-hexamethylenebis(amino-2,2,6,6-tetramethylpiperidine).

EXAMPLE 18

Red scented candle wax is well stabilized by 0.1% by weight of 2,4-bis[2-hydroxy-4-(3-butyloxy-2-hydroxypropoxy)phenyl]-6-mesityl-s-triazine in combination with 0.1% by weight of N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

EXAMPLE 19

Green scented candle wax is well stabilized by 0.1% by weight of 2,4-bis(2,4-dimethylphenyl)-6-(2-hydroxy-4-octyloxyphenyl)-s-triazine in combination with 0.1% by weight of octamethylene bis(2,2,6,6-tetramethylpiperidin-4-carboxylate).

EXAMPLE 20

Green scented candle wax is well stabilized by 0.1% by weight of 2,4-diphenyl-6-(2-hydroxy-4-hexyloxyphenyl)-s-triazine in combination with 0.1% by weight of N-2,2,6,6-tetramethylpiperidin-4-yl-n-dodecylsuccinimide.

EXAMPLE 21

Blue scented candle wax is well stabilized by 0.1% by weight of 2,4-bis(2,4-dimethylphenyl)-6-[2-hydroxy-4-(3-do-/tri-decyloxy-2-hydroxypropoxy)phenyl]-s-triazine in combination with 0.1% by weight of N-1,2,2,6,6-pentamethylpiperidin-4-yl-n-dodecylsuccinimide.

EXAMPLE 22

Blue scented candle wax is well stabilized by 0.2% by weight of 2,4-bis(2,4-dimethylphenyl)-6-[2-hydroxy-4-(3-do-/tri-decyloxy-2-hydroxypropoxy)-5-α-cumylphenyl]-s-triazine in combination with 0.1% by weight of N-1-acetyl-2,2,6,6-tetramethylpiperidin-4-yl-n-dodecylsuccinimide.

EXAMPLE 23

Red unscented candle wax is well stabilized by 0.2% by weight of reaction product of 2,4,6-tris(2,4-dihydroxyphenyl)-s-triazine with isooctyl α-halopropionate in combination with 0.1% by weight of 4-$C_{15}$–$C_{17}$alkanoyloxy-2,2,6,6-tetramethylpiperidine.

EXAMPLE 24

Red unscented candle wax is well stabilized by 0.1% by weight of 2-(2,4-dibutyloxyphenyl)-4,6-bis(2-hydroxy-4-butyloxyphenyl)-s-triazine in combination with 0.1% by weight of the polycondensation product of 2,4-dichloro-6-cyclohexylamino-s-triazine and 4,4'-hexa-methylenebis(amino-2,2,6,6-tetramethylpiperidine).

EXAMPLE 25

Yellow unscented candle wax is well stabilized by 0.1% by weight of 2,4-bis(2,4-dimethylphenyl)-6-(2-hydroxy-4-octyloxyphenyl)-s-triazine in combination with 0.1% by weight of 1,5-bis(2,2,6,6-tetramethylpiperidin-4-yl)-1,5-diaza-4-oxopropane.

EXAMPLE 26

Yellow unscented candle wax is well stabilized by 0.1% by weight of 2,4-bis(2,4-dimethylphenyl)-6-[2-hydroxy-4-(3-do-/tri-decyloxy-2-hydroxypropoxy)phenyl]-s-triazine in combination with 0.1% by weight of a copolymer of methyl methacrylate, ethyl acrylate and 2,2,6,6-tetramethylpiperidin-4-yl acrylate.

EXAMPLE 27

Blue scented candle wax is well stabilized by 0.1% by weight of 2,4-bis(2,4-dimethylphenyl)-6-[2-hydroxy-4-(3-do-/tri-decyloxy-2-hydroxypropoxy)-5-α-cumylphenyl]-s-triazine in combination with 0.1% by weight of 2,2,4,4-tetramethyl-7-oxa-3,20-diaza-21-oxo-dispiro-[5,1,11,2] heneicosane.

EXAMPLE 28

Blue unscented candle wax is well stabilized by 0.2% by weight of 2,4-bis(2,4-dimethylphenyl)-6-(2-hydroxy-4-octyloxyphenyl)-s-triazine in combination with 0.1% by weight of 1-acetyl-2,2,6,6-tetramethyl-4,4-(1-oxa-2,4-dioxo-3-dodecyliminotetramethylene)piperidine, TINUVIN® 440, CIBA, and 0.1% by weight of 1,3,5-tris[3-(2,2,6,6-piperidin-4-ylamino)-2-hydroxy-propyl) isocyanurate.

EXAMPLE 29

Blue unscented candle wax is well stabilized by 0.1% by weight of 2,4-bis(2,4-dimethylphenyl)-6-[2-hydroxy-4-(3-do-/tri-decyloxy-2-hydroxypropoxy)phenyl]-s-triazine, TINUVIN® 400, CIBA, in combination with 0.1% by weight of bis(1,2,2,6,6-pentamethylpiperidin-4-yl)sebacate, TINUVIN®292, CIBA, and 0.1% by weight of 1-acetyl-2,2,6,6-tetramethyl-4,4-(1-oxa-2,4-dioxo-3-dodecyliminotetramethylene)piperidine, TINUVIN® 440, CIBA.

EXAMPLE 30

White unscented candle wax is well stabilized by 0.1% by weight of 2-mesityl-4,6-bis[2-hydroxy-4-(3-butyloxy-2-hydroxypropyloxy)phenyl]-s-triazine in combination with 2% by weight of olefin copolymer containing units derived from N-[2-(2,2,6,6-tetramethylpiperidin-4-yl)-oxalamid-1-yl]maleimide.

EXAMPLE 31

White unscented candle wax is well stabilized by 0.1% by weight of 2,4,6-tris[2-hydroxy-4-(3-sec-butyloxy-2-hydroxypropyloxy)phenyl]-s-triazine in combination with 0.1% by weight of octyl 3-(benzotriazol-2-yl)-5-tert-butyl-4-hydroxyhydrocinnamate, TINUVIN® 384, CIBA, and 0.1% by weight of $C_{12}$–$C_{14}$alkyl 3-(2,2,4,4-tetramethyl-7-oxa-3,20-diaza-21-oxo-dispiro[5,1,11,2]heneicosane-20-yl) propionate.

EXAMPLE 32

Yellow scented candle wax is well stabilized by 0.1% by weight of 2-(2-hydroxy-3-α-cumyl-5-tert-octylphenyl)-2H-benzotriazole, TINUVIN® 928, CIBA combination with 0.1% by weight of 2,4-bis(2,4-dimethylphenyl)-6-[2-hydroxy-4-(3-do-/tri-decyloxy-2-hydroxypropoxy)phenyl]-s-triazine, TINUVIN® 400, CIBA, and 0.1% by weight of bis(2,2,6,6-tetramethylpiperidin-4-yl)sebacate.

EXAMPLE 33

Yellow scented candle wax is well stabilized by 0.1% by weight of 2,4-bis(4-biphenylyl)-6-(2-hydroxy-4-octyloxycarbonylethylideneoxyphenyl)-s-triazine in combination with 0.2% by weight of bis(1,2,2,6,6-pentamethylpiperidin-4-yl)sebacate.

EXAMPLE 34

Red scented candle wax is well stabilized by 0.2% by weight of 2,4-bis(2,4-dimethylphenyl)-6-[2-hydroxy-4-(3-nonyloxy*-2-hydroxypropyloxy)-5-α-cumylphenyl]-s-triazine (where * denotes a mixture of octyloxy, nonyloxy and decyloxy groups) in combination with 0.2% by weight of 4-benzoyloxy-2,2,6,6-tetramethylpiperidine and 0.1% of the N,N-dialkylhydroxylamine prepared from di(hydrogenated tallow)amine by direct oxidation, FS 042 CIBA.

What is claimed is:

1. A composition which consists essentially of (a) candle wax which is white and unscented; white and scented; dyed and unscented; dyed and scented; dipped and unscented; or dipped and scented, and (b) an effective stabilizing amount of a combination of (i) an s-triazine UV absorber of formula (I), (II), (III), (IV), (V) or (VI)

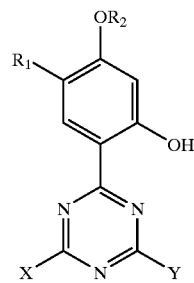

I

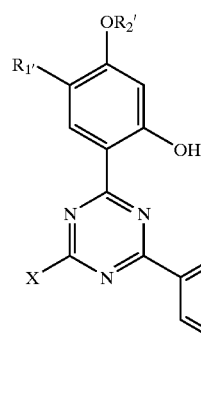

II

III

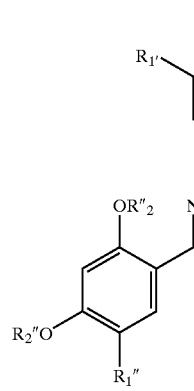

IV

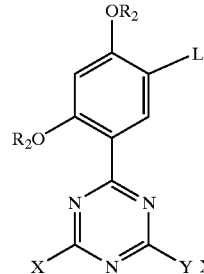

-continued

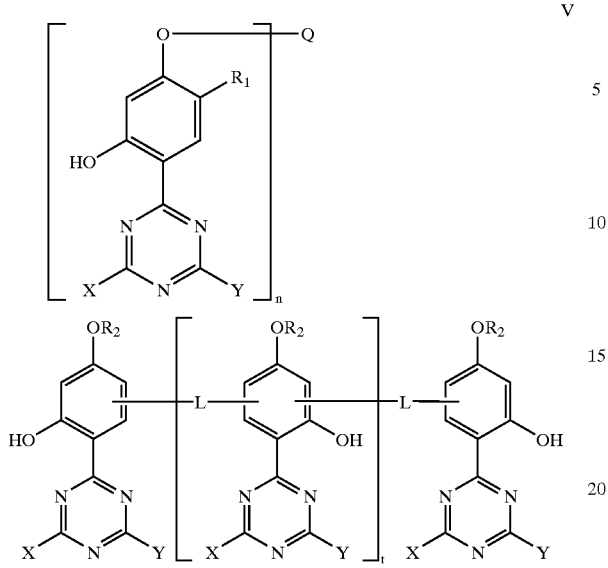

V

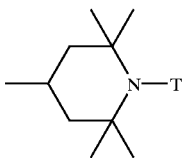

wherein

X and Y are independently phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms, halogen, —$SR_3$, —$SOR_3$ or —$SO_2R_3$; or said alkyl, said cycloalkyl or said phenylalkyl substituted by one to three halogen, —$R_4$, —$OR_5$, —$N(R_5)_2$, —$COR_5$, —$COOR_5$, —$OCOR_5$, —CN, —$NO_2$, —$SR_5$, —$SOR_5$, —$SO_2R_5$ or —$P(O)(OR_5)_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —$NR_5$—, —$CONR_5$—, —COO—, —OCO— or —CO groups or combinations thereof; or said alkyl or said cycloalkyl both substituted and interrupted by combinations of the groups mentioned above;

$R_3$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;

$R_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof; or straight or branched chain alkenyl of 2 to 18 carbon atoms;

$R_5$, is defined as is $R_4$; or $R_5$ is also hydrogen or straight or branched chain alkyl of 1 to 24 carbon atoms, alkenyl of 2 to 24 carbon atoms; or $R_5$ is a group for formula T is hydrogen, oxyl, hydroxyl, —$OT_1$, alkyl of 1 to 24 carbon atoms, said alkyl substituted by one to three hydroxy; benzyl or alkanoyl of 2 to 18 carbon atoms;

$T_1$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 o 10 carbon atoms or said aryl substituted by one to three alkyl of 1 to 4 carbon atoms;

$R_2$ is hydrogen, straight or branched chain alkyl of 1 to 24 carbon atoms or cycloalkyl of 5 to 12 carbon atoms; or said alkyl or said cycloalkyl substitute by one to four halogen, epoxy, glycidyloxy, furyloxy, —$R_4$, —$OR_5$, —$N(R_5)_2$, —$CON(R_5)_2$, —$COR_5$, —$COOR_5$, —$OCOR_5$, —$OCOC(R_5)$=$C(R_5)_2$, —$C(R_5)$=$CCOOR_5$, —CN, —NCO, or

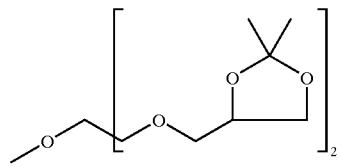

or combinations thereof; or said alkyl or said cycloalkyl interrupted by one to four epoxy, —O—, —$NR_5$—, —$CONR_5$—, —COO—, —OCO—, —CO—, —$C(R_5)$=$C(R_5)COO$—, —$OCOC(R_5)$=$C(R_5)$—, —$C(R_5)$=$C(R_5)$—, phenylene or phenylene-G-phenylene in which G is —O—, —S—, —$SO_2$—, —$CH_2$— or —$C(CH_3)_2$— or combinations thereof, or said alkyl or said cycloalkyl both substituted and interrupted by combinations of the groups mentioned above; or $R_2$ is —$SO_2R_3$ or —$COR_6$;

$R_6$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —$R_7$COOH or —NH—$R_8$—NCO;

$R_7$ is alkylene of 2 to 14 carbon atoms or phenylene;

$R_8$ is alkylene of 2 to 24 carbon atoms, phenylene, tolylene, diphenylmethane or a group

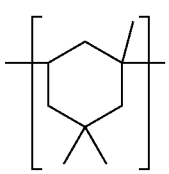

$R_1$, $R_1'$ and $R_1''$ are the same or different and are as defined for $R_1$;

$R_2$, $R_2'$ and $R_2''$ are the same or different and are as defined for $R_2$;

X, X', Y and Y' are the same or different and are as defined for X and Y;

t is 0 to 9;

L is straight or branched alkylene of 1 to 12 carbon atoms, cycloalkylene of 5 to 12 carbon atoms or alkylene substituted or interrupted by cyclohexylene or phenylene; or L is benzylidene; or L is —S—, —S—S—, —S—E—S—, —SO—, —SO$_2$—, —SO—E—SO—, —SO$_2$—E—SO$_2$—, —CH$_2$—NH—E—NH—CH$_2$— or

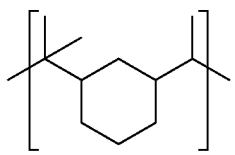

E is alkylene of 2 to 12 carbon atoms, cycloalkylene of 5 to 12 carbon atoms or alkylene interrupted or terminated by cycloalkylene of 5 to 12 carbon atoms;

n is 2, 3 or 4;

when n is 2; Q is straight or branched alkylene of 2 to 16 carbon atoms; or said alkylene substituted by one to three hydroxy groups; or said alkylene interrupted by one to three —CH=CH— or —O—; or said alkylene both substituted and interrupted by combinations of the groups mentioned above; or Q is xylylene or a group —CONH—R$_8$—NHCO—, —CH$_2$CH(OH)CH$_2$O—R$_9$—OCH$_2$CH(OH)CH$_2$—, —CO—R$_{10}$—CO—, or —(CH$_2$)$_m$—COO—R$_{11}$—OOC—(CH$_2$)$_m$—, where m is 1 to 3; or Q is

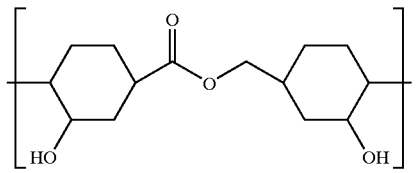

R$_9$ is alkylene of 2 to 50 carbon atoms; or said alkylene interrupted by one to ten —O—, phenylene or a group -phenylene-G-phenylene in which G is —O—, —S—, —SO$_2$—, —CH$_2$— or —C(CH$_3$)$_2$—;

R$_{10}$ is alkylene of 2 to 10 carbon atoms, or said alkylene interrupted by one to four —O—, —S— or —CH=CH—; or R$_{10}$ is arylene of 6 to 12 carbon atoms;

R$_{11}$ is alkylene of 2 to 20 carbon atoms or said alkylene interrupted by one to eight —O—;

when n is 3, Q is a group —[(CH$_2$)$_m$COO]$_3$—R$_{12}$ where m is 1 to 3, and R$_{12}$ is an alkanetriyl of 3 to 12 carbon atoms;

when n is 4, Q is a group —[(CH$_2$)$_m$COO]$_4$—R$_{13}$ where m is 1 to 3, and R$_{14}$ is an alkanetetrayl of 4 to 12 carbon atoms;

Z$_1$ is a group of formula

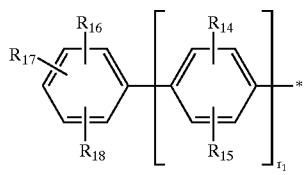

Z$_2$ is a group of formula

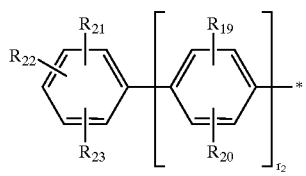

where r$_1$ and r$_2$ are independently of each other 0 or 1;

R$_{14}$, R$_{15}$, R$_{16}$, R$_{17}$, R$_{18}$, R$_{19}$, R$_{20}$, R$_{21}$, R$_{22}$ and R$_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or R$_{17}$ and R$_{18}$ or R$_{22}$ and R$_{23}$ together with the phenyl radical to which they are attached are a cyclic radical interrupted by one to three —O— or —NR$_5$—; and (ii) a classic piperidine-based hindered amine, wherein the ratio by weight of (i) to (ii) is from 10:1 to 1:10.

2. A composition according to claim 1 wherein the compound of component (b)(i) is an s-triazine UV absorber of formula (I) where X and Y are the same or different and are phenyl or said phenyl substituted by one to three alkyl of 1 to 6 carbon atoms, halogen, hydroxy or alkoxy of 1 to 12 carbon atoms; or Z$_1$ or Z$_2$;

R$_1$ is hydrogen, straight or branched chain alkyl of 1 to 24 carbon atoms, cycloalkyl of 5 to 12 carbon atoms, phenylalkyl of 7 to 15 carbon atoms or halogen;

R$_2$ is hydrogen, straight or branched chain alkyl of 1 to 24 carbon atoms or cycloalkyl of 5 to 12 carbon atoms; or said alkyl or said cycloalkyl substituted by one to three —R$_4$, —OR$_5$, —COOR$_5$, —OCOR$_5$ or combinations thereof; or said alkyl or cycloalkyl interrupted by one to three epoxy, —O—, —COO—, —OCO— or —CO—;

R$_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof;

R$_5$ is defined as is R$_4$; or R$_5$ is also hydrogen or straight or branched chain alkyl of 1 to 24 carbon atoms;

$Z_1$ is a group of formula

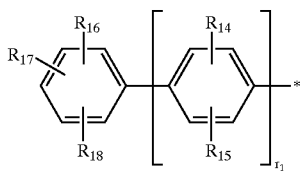

$Z_2$ is a group of formula

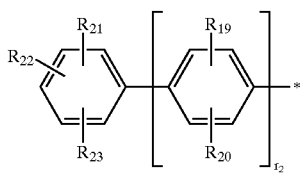

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, or alkoxycarbonyl of 2 to 12 carbon atoms or aminocarbonyl.

3. A composition according to claim 1 wherein the compound of component (b)(i) is an s-triazine UV absorber of formula (II) where X is phenyl, naphthyl or said phenyl or said naphthyl substituted by one to three alkyl of 1 to 6 carbon atoms, by halogen, by hydroxy or by alkoxy of 1 to 6 carbon atoms or by mixtures thereof; or X is $Z_1$;

$R_1$ and $R_1'$ are independently as defined for $R_1$; and $R_2$ and $R_2'$ are independently as defined for $R_2$.

4. A composition according to claim 1 wherein the compound of component (b)(i) is an s-triazine UV absorber of formula (III) where $R_1$, $R_1'$ and $R_1''$ are independently as defined for $R_1$; and $R_2$, $R_2'$ and $R_2''$ are independently as defined for $R_2$.

5. A composition according to claim 1 wherein the compound of component (b)(i) is an s-triazine UV absorber of formula (VI) where X and Y are independently phenyl or said phenyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$; and L is straight or branched alkylene of 1 to 12 carbon atoms, cycloalkylene of 5 to 12 carbon atoms or alkylene substituted or interrupted by cyclohexylene or phenylene.

6. A composition according to claim 1 wherein the compound of component (b)(i) is an s-triazine UV absorber of formula (I) where X and Y are the same or different and are phenyl or said phenyl substituted by one to three alkyl of 1 to 6 carbon atoms; $Z_1$ or $Z_2$;

$R_1$ is hydrogen or phenylalkyl of 7 to 15 carbon atoms;

$R_2$ is hydrogen, straight or branched chain alkyl of 1 to 18 carbon atoms; or said alkyl substituted by one to three —$R_4$, —$OR_5$ or mixtures thereof; or said alkyl interrupted by one to eight —O— or —COO—;

$R_4$ is aryl of 6 to 10 carbon atoms;

$R_5$ is hydrogen;

$Z_1$ is a group of formula

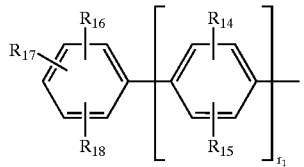

$Z_2$ is a group of formula

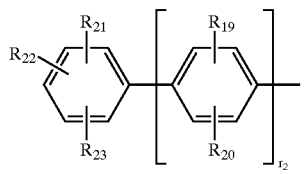

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are each hydrogen.

7. A composition according to claim 1 wherein the compound of component (b)(i) is an s-triazine UV absorber which is (a) 2,4-bis[2-hydroxy-4-(3-butyloxy-2-hydroxypropoxy)phenyl]-6-mesityl-s-triazine;

(b) 2,4-bis(2,4-dimethylphenyl)-6-(2-hydroxy-4-octyloxyphenyl)-s-triazine, CYASORB® 1164, Cytec;

(c) 2,4-diphenyl-6-(2-hydroxy-4-hexyloxyphenyl)-s-triazine;

(d) 2,4-bis(2,4-dimethylphenyl)-6-[2-hydroxy-4-(3-do-/tridecyloxy-2-hydroxypropoxy)-phenyl]-s-triazine;

(e) 2,4-bis(2,4-dimethylphenyl)-6-[2-hydroxy-4-(3-do-/tridecyloxy-2-hydroxypropoxy)-5-α-cumylphenyl]-s-triazine;

(f) reaction product of 2,4,6-tris(2,4-dihydroxyphenyl)-s-triazine with isooctyl α-halopropionate;

(g) 2-(2,4-dibutyloxyphenyl)-4,6-bis(2-hydroxy-4-butyloxyphenyl)-s-triazine;

(h) 2,4-bis(4-biphenylyl)-6-(2-hydroxy-4-octyloxycarbonylethylideneoxyphenyl)-s-triazine;

(i) 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;

(j) 2,4-bis(2,4-dimethylphenyl)-6-[2-hydroxy-4-(3-benzyloxy-2-hydroxypropyloxy)phenyl]-s-triazine;

(k) 2,4-bis(2-hydroxy-4-butyloxyphenyl)-6-(2,4-dibutyloxyphenyl)-s-triazine;

(l) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups)

(m) methylenebis-[2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio;

(n) 2,4,6-tris(2-hydroxy-4-isooctyloxycarbonylisopropylideneoxyphenyl)-s-triazine;

(o) 2,4-bis(2,4-dimethylphenyl)-6-(2-hydroxy-4-hexyloxy-5-α-cumylphenyl)-s-triazine; or (p) 2,4,6-tris[2-hydroxy-4-(3-sec-butyloxy-2-hydroxypropyloxy)phenyl]-s-triazine.

8. A composition according to claim 7 wherein the s-triazine UV absorber is
(a) 2,4-bis[2-hydroxy-4-(3-butyloxy-2-hydroxypropoxy)phenyl]-6-mesityl-s-triazine;
(f) reaction product of 2,4,6-tris(2,4-dihydroxyphenyl)-s-triazine with isooctyl α-halopropionate;
(h) 2,4-bis(4-biphenylyl)-6-(2-hydroxy-4-octyloxycarbonylethylideneoxyphenyl)-s-triazine;
(l) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups) or
(n) 2,4,6-tris(2-hydroxy-4-isooctyloxycarbonylisopropylideneoxyphenyl)-s-triazine.

9. A composition according to claim 1 wherein the ratio by weight of (i) to (ii) is from 4:1 to 1:4.

10. A composition according to claim 9 wherein the ratio by weight of (i) to (ii) is from 2:1 to 1:2.

11. A composition according to claim 1 wherein the effective amount of the s-triaazine UV absorber plus the hindered amine in the candle wax is 0.01 to 10% by weight based on the wax.

12. A composition according to claim 11 wherein the effective amount of the s-triazine UV absorber plus hindered amine in the candle wax is 0.1 to 2% by weight based on the wax.

13. A composition according to claim 12 wherein the effective amount of the s-triazine UV absorber plus hindered amine in the candle wax is 0.1 to 0.5% by weight based on the wax.

14. A composition according to claim 1 wherein the hindered amine of component (b)(ii) is
(a) bis(2,2,6,6-tetramethylpiperidin-4-yl)sebacate,
(b) bis(1,2,2,6,6-pentamethylpiperidin-4-yl)sebacate,
(c) di(1,2,2,6,6-pentamethylpiperidin-4-yl)(3,5-di-tert-butyl-4-hydroxybenzyl)butylmalonate,
(d) 4-benzoyloxy-2,2,6,6-tetramethylpiperidine,
(e) 4-stearyloxy-2,2,6,6-tetramethylpiperidine,
(f) tris(2,2,6,6-tetramethylpiperidin-4-yl)nitrilotriacetate,
(g) polycondensation product of 2,4-dichloro-6-tert-octylamino-s-triazine and 4,4'-hexamethylenebis(amino-2,2,6,6-tetramethylpiperidine),
(h) polycondensation product of 1-(2-hydroxyethyl)-2,2,6,6-tetramethyl-4-hydroxypiperidine and succinic acid,
(i) polycondensation product of 4,4'-hexamethylenebis-(amino-2,2,6,6-tetramethylpiperidine) and 1,2-dibromoethane,
(j) tetrakis(2,2,6,6-tetramethylpiperidin-4-yl) 1,2,3,4-butanetetracarboxylate,
(k) tetrakis(1,2,2,6,6-pentamethylpiperidin-4-yl) 1,2,3,4-butanetetracarboxylate,
(l) polycondensation product of 2,4-dichloro-6-morpholino-s-triazine and 4,4'-hexamethylenebis(amino-2,2,6,6-tetramethylpiperidine),
(m) N,N',N'',N'''-tetrakis[(4,6-bis(butyl-1,2,2,6,6-pentamethylpiperidin-4-yl)-amino-s-triazin-2-yl]-1,10-diamino-4,7-diazadecane,
(n) octamethylene bis(2,2,6,6-tetramethylpiperidin-4-carboxylate),
(o) N-2,2,6,6-tetramethylpiperidin-4-yl-n-dodecylsuccinimide,
(p) N-1,2,2,6,6-pentamethylpiperidin-4-yl-n-dodecylsuccinimide,
(q) N-1-acetyl-2,2,6,6-tetramethylpiperidin-4-yln-dodecylsuccinimide,
(r) 4-$C_{15}$–$C_{17}$alkanoyloxy-2,2,6,6-tetramethylpiperidine,
(s) polycondensation product of 2,4-dichloro-6-cyclohexylamino-s-triazine and 4,4'-hexamethylenebis(amino-2,2,6,6-tetramethylpiperidine),
(t) 1,5-bis(2,2,6,6-tetramethylpiperidin-4-yl)-1,5-diaza-4-oxopropane,
(u) copolymer of methyl methacrylate, ethyl acrylate and 2,2,6,6-tetramethylpiperidin-4-yl acrylate,
(v) copolymer of N-octadecylmaleimide, styrene and N-(2,2,6,6-tetramethylpiperidin-4-yl)maleimide,
(w) 1,3,5-tris[3-(2,2,6,6-piperidin-4-ylamino)-2-hydroxypropyl]isocyanurate,
(x) olefin copolymer containing units derived from N-[2-(2,2,6,6-tetramethylpiperidin-4-yl)oxalamid-1-yl] maleimide,
(y) 2,2,4,4-tetramethyl-7-oxa-3,20-diaza-21-oxo-dispiro[5,1,11,2]heneicosane,
(z) $C_{12}$–$C_{14}$alkyl 3-(2,2,4,4-tetramethyl-7-oxa-3,20-diaza-21-oxo-dispiro[5,1,11,2]heneicosane-20-yl)propionate,
(aa) reaction product of epichlorohydrin and 2,2,4,4-tetramethyl-7-oxa-3,20-diaza-21-oxo-dispiro[5,1,11,2] heneicosane,
(bb) 1,3-di(2,2,6,6-tetramethylpiperidin-4-yl) 2,4-ditridecyl butanetetracarboxylate,
(cc) 1,3-di(1,2,2,6,6-pentamethylpiperidin-4-yl) 2,4-ditridecyl butanetetracarboxylate,
(dd) polycondensation product of 3,9-bis(1,1-dimethyl-2-hydroxyethyl)-2,4,8,10-tetraoxaspiro[5.5]undecane, tetramethyl 1,2,3,4-butanetetra-carboxylate and 2,2,6,6-tetramethyl-4-hydroxypiperidine.
(ee) polycondensation product of 3,9-bis(1,1-dimethyl-2-hydroxyethyl)-2,4,8,10-tetraoxaspiro[5.5]undecane, tetramethyl 1,2,3,4-butanetetra-carboxylate and 1,2,2,6,6-pentamethyl-4-hydroxypiperidine,
(ff) 1,4-bis(2,2,6,6-tetramethylpiperidin-4-yl)-2,2-dimethyl-1,4-diaza-4-oxopropane,
(gg) reaction product of 4-amino-2,2,6,6-tetramethylpiperidine and tetramethylolacetylenediurea,
(hh) 1,6-hexamethylenebis[N-formyl-N-(2,2,6,6-tetramethylpiperidin-4-yl)amine],
(ii) copolymer of N-(2,2,6,6-tetramethylpiperdin-4-yl) maleimide and a $C_{20}$–$C_{24}$-alpha-olefin,
(jj) poly[3-(2,2,6,6-tetramethylpiperidin-4-yloxy)propyl-methyl-siloxane],
(kk) polycondensation product of 2,4-dichloro-6-[N-butyl-N-(2,2,6,6-tetramethylpiperidin-4-yl)amino]-s-triazine and 1,10-diamino-4,7-diazadecane, or
(ll) dodecyl 3-(2,2,4,4-tetramethyl-7-oxa-3,20-diaza-21-oxo-dispiro[5,1,11,2]heneicosane-20-yl)propionate.

15. A composition according to claim 14 wherein the hindered amine is
(a) bis(2,2,6,6-tetramethylpiperidin-4-yl)sebacate,
(b) bis(1,2,2,6,6-pentamethylpiperidin-4-yl)sebacate,
(c) di(1,2,2,6,6-pentamethylpiperidin-4-yl)(3,5-di-tert-butyl-4-hydroxybenzyl)butylmalonate,
(g) polycondensation product of 2,4-dichloro-6-tert-octylamino-s-triazine and 4,4'-hexamethylenebis(amino-2,2,6,6-tetramethylpiperidine),
(h) polycondensation product of 1-(2-hydroxyethyl)-2,2,6,6-tetramethyl-4-hydroxypiperidine and succinic acid, or
(m) N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

16. A composition according to claim 1 which additionally contains a further UV absorber which is benzotriazole, a benzophenone, an α-cyanoacrylate, an oxanilide, a cinnamate, a malonate, a benzoate or a salicylate, or a mixture thereof.

17. A composition according to claim 16 wherein the additional UV absorber is a benzotriazole or a benzophenone.

18. A composition according to claim 16 wherein the additional UV absorber is
(a) 4-octyloxy-2-hydroxybenzophenone;
(b) 4-methoxy-2-hydroxybenzophenone;
(c) 2-(2-hydroxy-5-methylphenyl)-2H-benzotriazole;
(d) 2-(2-hydroxy-5-tert-octylphenyl-2H-benzotriazole;
(e) 2-(2-hydroxy-3,5-di-tert-amylphenyl)-2H-benzotriazole;
(f) octyl 3-(benzotriazol-2-yl)-5-tert-butyl-4-hydroxyhydrocinnamate;
(g) 2-(2-hydroxy-3,5-di-tert-butylphenyl)-2H-benzotriazole;
(h) 2-(2-hydroxy-5-tert-butylphenyl)-2H-benzotriazole;
(i) 5-chloro-2-(2-hydroxy-3,5-di-tert-butylphenyl)-2H-benzotriazole;
(j) 5-chloro-2-(2-hydroxy-3-tert-butyl-5-methylphenyl)-2H-benzotriazole;
(k) 2-(2-hydroxy-3-sec-butyl-5-tert-butylphenyl)-2H-benzotriazole;
(l) 2-(2-hydroxy-4-octyloxyphenyl)-2H-benzotriazole;
(m) 2-(2-hydroxy-3-dodecyl-5-methylphenyl)-2H-benzotriazole;
(n) 2-[2-hydroxy-3,5-di($\alpha,\alpha$-dimethylbenzyl)phenyl]-2H-benzotriazole;
(o) 2-[2-hydroxy-3-($\alpha,\alpha$-dimethylbenzyl)-5-tert-octylphenyl]-2H-benzotriazole;
(p) 2-{2-hydroxy-3-tert-butyl-5-[2-(omega-hydroxy-octa(ethyleneoxy)carbonyl)ethyl]phenyl}-2H-benzotriazole;
(q) 2-{2-hydroxy-3-tert-butyl-5-[2-(octyloxy)carbonyl)ethyl]phenyl}-2H-benzotriazole;
(r) 2-ethylhexyl p-methoxycinnamate;
(s) 4-methoxy-2,2'-dihydroxybenzophenone; or
(t) 4,4'dimethoxy-2,2'-dihydroxybenzophenone.

19. A composition according to claim 18 wherein the additional UV absorber is
(a) 4-octyloxy-2-hydroxybenzophenone;
(b) 4-methoxy-2-hydroxybenzophenone;
(d) 2-(2-hydroxy-5-tert-octylphenyl-2H-benzotriazole;
(o) 2-[2-hydroxy-3-($\alpha,\alpha$-dimethylbenzyl)-5-tert-octylphenyl]-2H-benzotriazole;
(p) 2-{2-hydroxy-3-tert-butyl-5-[2-(omega-hydroxy-octa(ethyleneoxy)carbonyl)ethyl]-phenyl}-2H-benzotriazole; or
(q) 2-{2-hydroxy-3-tert-butyl-5-[2-(octyloxy)carbonyl)ethyl]phenyl}-2H-benzotriazole.

20. A composition according to claim 1 wherein the composition additionally contains an antioxidant which is a phenolic antioxidant, phosphite, nitrone, amine oxide or hydroxylamine, or mixture thereof.

21. A composition according to claim 20 wherein the effective amount of s-triazine UV absorber in combination with the hindered amine compound and an antioxidant is 0.01 to 10% by weight based on the wax.

22. A composition according to claim 21 wherein the the effective amount of s-triazine UV absorber in combination with the hindered amine compound and an antioxidant is 0.1 to 2% by weight based on the wax.

23. A composition according to claims 22 wherein the effective amount of s-triazine UV absorber in combination with the hindered amine compound and an antioxidant is 0.1 to 0.5% by weight based on the wax.

24. A composition according to claim 20 wherein the antioxidant is
n-octadecyl 3,5-di-tert-butyl-4-hydroxyhydrocinnamate,
neopentanetetrayl tetrakis(3,5-di-tert-butyl-4-hydroxyhydrocinammate),
di-n-octadecyl 3,5-di-tert-butyl-4-hydroxybenzylphosphonate,
1,3,5-tris(3,5-di-tert-butyl-4-hydroxybenzyl)isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl)isocyanurate,
1,1,3,-tris(2-methyl-4-hydroxy-5-tert-butylphenyl)butane,
1,3,5-tris[2-(3,5-di-tert-butyl-4-hydroxyhydrocinnamoyloxy)ethyl]isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl)butyrate],
octyl 3,5-di-tert-butyl-4-hydroxybenzylmercaptoacetate,
bis(3,5-di-tert-butyl-4-hydroxyhydrocinnamoyl)hydrazide,
N,N-di-($C_{12}$–$C_{24}$alkyl)-N-methyl-amine oxide, or
N,N-dialkylhydroxylamine prepared from di(hydrogenated tallow)amine by direct oxidation.

25. A composition according to claim 24 wherein the antioxidant is
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl)isocyanurate,
2,6-di-tert-butyl-p-cresol, or
2,2'-ethylidene-bis(4,6-di-tert-butylphenol).

* * * * *